Figure 1:
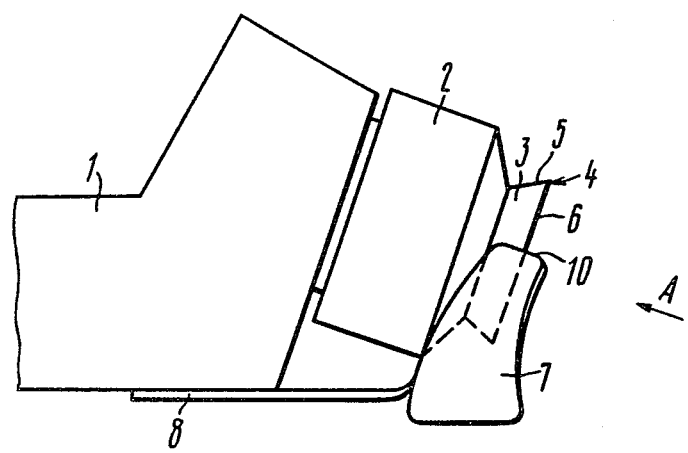

United States Patent [19]

Gik

[11] 4,275,626
[45] Jun. 30, 1981

[54] ROTARY CUTTING TOOL

[76] Inventor: Lev A. Gik, ulitsa Elblongskaya, 13, kv. 16, Kaliningrad, U.S.S.R.

[21] Appl. No.: 103,367

[22] Filed: Dec. 13, 1979

[51] Int. Cl.³ .......................... B23B 29/00; B26D 1/00
[52] U.S. Cl. ....................................... 82/36 R; 407/2; 407/7
[58] Field of Search ................... 82/36 R; 407/2, 6, 7

[56] References Cited

U.S. PATENT DOCUMENTS 4,223,580  9/1980  Sidorenko et al. ................. 82/36 R

FOREIGN PATENT DOCUMENTS 509385  4/1976  U.S.S.R. ........................................ 407/6
525500  8/1976  U.S.S.R. ........................................ 407/7
562386  6/1977  U.S.S.R. ........................................ 407/7

Primary Examiner—Harrison L. Hinson
Attorney, Agent, or Firm—Fleit & Jacobson

[57] ABSTRACT

The proposed cutting tool comprises a holder, wherein a working head is rotatably mounted. The working head carries at least one edge whose cutting lip is defined by intersecting of its face and relief surfaces. The cutting tool incorporates a chip-breaking device, according to the invention, which is essentially a plate made fast on the holder at an angle to the face surface of the edge to provide for chip disposal from the cutting zone and arranged in such a manner that one of its edges crosses the cutting lip of the tool edge and is located as close as possible to the edge face surface, provision being made for the working head to freely rotate.

2 Claims, 2 Drawing Figures

U.S. Patent

Jun. 30, 1981

4,275,626

ROTARY CUTTING TOOL

The present invention relates generally to metal-cutting tools and, more specifically, to rotary cutting tools.

The invention can find most utility when applied for machining ductile metals and alloys to form flow chip.

The invention can also be used for machining plastics and some elastic nonmetallic materials.

Known in the prior art is a rotary cutting tool comprising a holder wherein a working head is rotatably mounted. The cutting lip of the head is defined by the intersection of the tool face and relief surfaces. The tool is provided with a chip-breaking device in the form of a knife, made fast on the rotary cutting head. The knife edge is located as close as possible to the side surface of the cutting head and spaced apart from the cutting lip of the head edge at a distance not exceeding the amount of the zone of contact of chip with the side head surface (cf. USSR Inventor's Certificate No. 415,100, 1971).

In the course of cutting the knife gets periodically into the cutting zone and thus leaves a trace on the machined surface, as its edge stands out beyond the face of the head edge which impairs the quality of the surface being machined.

In addition, such a construction of the chip-breaking device fails to provide a directional chip disposal beyond the cutting zone, whereby chip might be caught by the knife protruding beyond the face of the head edge and be wound onto the cutting tool or the workpiece being machined, as well as (which might occur when chip is wound onto the cutting tool) secondary getting of chip into the cutting zone from the relief surface of the head edge and its embedding in the machined surface might occur, thus affecting adversely the quality of machining.

Furthermore, mounting of the knife on a rotary head complicates the construction of the device, since the knife itself should be made of a costly tool material due to the fact that it has to cut chip under conditions of impact load.

It is a primary object of the present invention to provide a rotary cutting tool, comprising such a chip-breaking device that ensures high quality machining and directional chip disposal and prevents chip from being caught by the knife, its getting into the cutting zone and embedding in the machined surface, so as to improve the quality of machining, and simplify the construction of the cutting tool involved.

It is the main object of the present invention to provide a rotary cutting tool capable of high-quality machining.

It is another object of the present invention to provide a rotary cutting tool featuring a simple constructional embodiment.

These and other objects are attained in a rotary cutting tool, comprising a holder with a working head rotatably mounted therein and carrying at least one edge having a cutting lip which is defined by intersecting the face and relief surfaces of said tool edge, said cutting tool being provided with a chip-breaking device, wherein, according to the invention, the chip-breaking device is essentially a plate made fast on the holder in such a manner that one of the edges of said plate crosses the cutting lip of the tool edge and is located as close as possible to the tool edge face to enable the working head to freely rotate, while the plate itself is inclined towards the face of the tool edge at an angle providing for chip disposal from the cutting zone.

With the chip-breaking device made as a plate and secured to the holder the construction of the rotary cutting tool is considerably simplified due to the fact that the holder has no provision for rotation, whereby the device can be more easily mounted thereon from the point of view of technology. Moreover, the holder is made of a constructional material, rather than of an intractable hard tool material.

As a consequence of the chip-breaking device being made as a plate, the construction of the cutting tool is considerably simplified and does not require the use of costly tool material.

The arrangement of the plate on the holder in such a manner that one of its edges crosses the cutting lip of the edge and is located as close as possible to the tool edge face promotes reliable breaking of chip because of its own kinetic energy and prevents the chip from being caught by the rotating working head due to the fact that the plate edge is disposed on the way of the chip flow-off at a preset distance from the cutting zone or the workpiece being machined, as well as eliminates secondary penetration of chip into the cutting zone.

Arrangement of the plate at an angle to the face of the edge provides for good chip disposal in a necessary direction, and prevents chip from secondary penetration into the cutting zone and from being wound onto the rotating tool working head or the workpiece being machined, since the plate covers the vacant space between the tool face and the surface of the workpiece being machined.

It is expedient that the angle, providing for chip disposal from the cutting zone, be within 90° to 180°.

The above angle range ensures free flow of chip into the chip bin and precludes any possibility of chip penetration into the cutting zone. At an angle less than 90° the chip will be thrown upwards and, consequently might drop into the cutting zone.

An angle exceeding 180° is impractical since in this case the plate will cut into the edge body.

Figure 2:
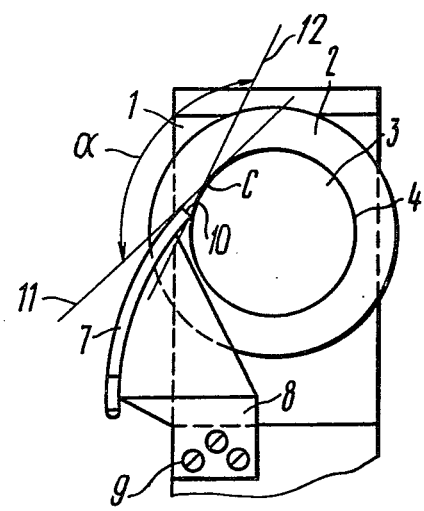

In what follows the present invention is illustrated by a detailed description of a specific embodiment thereof and the accompanying drawings, wherein:

FIG. 1 is a diagrammatic view of a rotary cutting tool incorporating a chip-breaking device, according to the invention, and FIG. 2 is a view along arrow A in FIG. 1.

Referring now to the accompanying drawings, proposed herein is the rotary cutting tool as illustrated in FIGS. 1 and 2, comprising a holder 1 and a working head 2 rotatably mounted therein. The cutting tool is provided with a chip-breaking device. The working head 2 carries an edge 3 having a cutting lip 4 which is defined by intersecting a face surface 5 and a relief surface 6 of the edge 3.

According to the invention, the chip-breaking device is made as a plate 7 having a bent portion 8 attached by bolts 9 (FIG. 2) to the holder 1.

The plate 7 is secured to the holder 1 in such a manner that one of its edges 10 crosses the cutting lip 4 of the edge 3 at an imaginary point C and is located as close as possible to the face surface 5 of the edge 3, thus rendering the working head 2 freely rotatable round the holder 1. The plate 7 itself is made fast on the holder 1 at an angle $\alpha$ which lies between tangents 11 and 12, respectively, to the plate and the face surface of the edge 3 at an imaginary point C of intersection of the edge 10 of the plate 7 with the cutting lip 4 of the edge 3. This angle ranges from 90° to 180°. It is most advantageous that the angle should lie within 120° to 180° which ensures more free and smooth flow of chip in a predetermined direction.

The rotary cutting tool according to the invention operates as follows. The plate 7 whose edge 10 crosses the cutting lip 4 of the edge 3 protrudes beyond the edge 3 pointing in the direction of the workpiece being machined (not shown) in such a manner that it completely covers the space between the working head 2 of the cutting tool and the workpiece being machined, thus preventing chip from being caught by the rotatable working head 2 and eliminating its penetration into the cutting zone.

In the process of cutting, chip flowing from the edge 3 of the working head 2 due to its own kinetic energy, hits the edge 10 of the plate 7 spaced apart from the cutting zone at a preset distance and, consequently breaks recurrently, whereupon it is withdrawn from the cutting zone, for example, to a chip bin, by an inclined wider face of the plate 7.

What is claimed is:

1. A rotary cutting tool, comprising a holder, a working head mounted rotatably on said holder, at least one edge of said working head having a face surface and a relief surface, and a cutting lip which is defined by intersection of said surfaces, a chip-breaking device being essentially a plate made fast on said holder in such a manner that one of its edges crosses the cutting lip of said tool edge and is located as close as possible to the face surface thereof with the provision for said working head to freely rotate, while the plate itself is inclined towards the surface of said edge at an angle which provides for chip disposal from the cutting zone.

2. A rotary cutting tool as claimed in claim 1, wherein the angle providing for chip disposal from the cutting zone lies within 90° to 180°.

* * * * *